US012558894B2

(12) United States Patent
Mizuno et al.

(10) Patent No.: US 12,558,894 B2
(45) Date of Patent: Feb. 24, 2026

(54) LIQUID DROPLET EJECTING HEAD

(71) Applicant: BROTHER KOGYO KABUSHIKI KAISHA, Nagoya (JP)

(72) Inventors: Taisuke Mizuno, Yokkaichi (JP); Toru Kakiuchi, Chita (JP); Takaaki Yoshino, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 174 days.

(21) Appl. No.: 18/632,425

(22) Filed: Apr. 11, 2024

(65) Prior Publication Data

US 2024/0359463 A1 Oct. 31, 2024

(30) Foreign Application Priority Data

Apr. 28, 2023 (JP) ................................ 2023-074141

(51) Int. Cl.
*B41J 2/14* (2006.01)

(52) U.S. Cl.
CPC ........ *B41J 2/14233* (2013.01); *B41J 2202/11* (2013.01)

(58) Field of Classification Search
CPC ............... B41J 2/14233; B41J 2202/11; B41J 2202/12; B41J 2002/14419
See application file for complete search history.

(56) References Cited

U.S. PATENT DOCUMENTS

2011/0316934 A1 12/2011 Nishikawa

FOREIGN PATENT DOCUMENTS

JP 4192458 B2 * 12/2008 ............. B41J 2/055
JP 2012030582 A 2/2012

OTHER PUBLICATIONS

Okuda et al., “Inkjet Recording Head And Inkjet Recording Apparatus” (JP 4192458 B2), Dec. 10, 2008, [Paragraphs 0042-0045] (Year: 2008).*

* cited by examiner

*Primary Examiner* — Lisa Solomon
(74) *Attorney, Agent, or Firm* — Element IP, PLC

(57) ABSTRACT

There is provided a liquid droplet ejecting head including: a channel member having a plurality of individual channels and a first common channel communicating with an inlet port of each of the plurality of individual channels; and a piezoelectric element arranged on the channel member. Each of the plurality of individual channels includes a nozzle, a pressure chamber communicating with the nozzle and a first communicating channel having an end which is the inlet port and the other end which communicates with the pressure chamber. The piezoelectric element is configured to apply a pressure to a liquid inside the pressure chamber to cause a liquid droplet of the liquid to be ejected from the nozzle. A channel resistance R1 [N s/m$^5$] of the first communicating channel satisfies a first relational expression: $3.48\times10^{13}\leq R1\leq6.98\times10^{13}$.

15 Claims, 5 Drawing Sheets

LIQUID DROPLET EJECTING HEAD

REFERENCE TO RELATED APPLICATIONS

This application claims priority from Japanese Patent Application No. 2023-074141 filed on Apr. 28, 2023. The entire content of the priority application is incorporated herein by reference.

BACKGROUND ART

Conventionally, there is a known relational expression among channel resistance in an individual supply channel, channel resistance in an individual recovery channel, and the diameter of a nozzle to improve the refilling characteristic.

SUMMARY

By using a technique that uses the known relational expression, the refilling characteristic can be improved, and an under-refilling phenomenon can be reduced. The under-refilling phenomenon is a phenomenon in which a supply amount of a liquid from a supply manifold (first common channel) to a liquid droplet ejecting part (individual channel) becomes insufficient or short.

In the case that a driving frequency is increased so as to perform a high-speed recording, however, an ejecting period becomes short, which in turn allows any residual vibration or residual oscillation to easily remain inside the individual channel. In the case that the residual vibration remains inside the individual channel, the ejecting characteristic is changed, due to which any desired ejection cannot be realized. In the technique using the known relational expression, although the under-refilling phenomenon can be prevented, the residual vibration inside the individual channel cannot be suppressed quickly.

An object of the present disclosure is to provide a liquid droplet ejecting head configured to prevent the under-refilling phenomenon and of quickly suppressing the residual vibration in the inside of the individual channel, also in a case that the driving frequency is increased to be high in order to perform the high-speed recording.

According to an aspect of the present disclosure, there is provided a liquid droplet ejecting head including: a channel member having a plurality of individual channels and a first common channel communicating with an inlet port of each of the plurality of individual channels; and a piezoelectric element arranged on the channel member. Each of the plurality of individual channels includes a nozzle, a pressure chamber communicating with the nozzle and a first communicating channel having an end which is the inlet port and the other end which communicates with the pressure chamber. The piezoelectric element is configured to apply pressure to a liquid inside the pressure chamber to cause a liquid droplet of the liquid to be ejected from the nozzle. A channel resistance R1 [N s/m$^5$] of the first communicating channel satisfies a first relational expression: $3.48\times10^{13}\leq R1\leq 6.98\times10^{13}$.

DESCRIPTION

[Overall Configuration of Printer 100]

Figure 1:
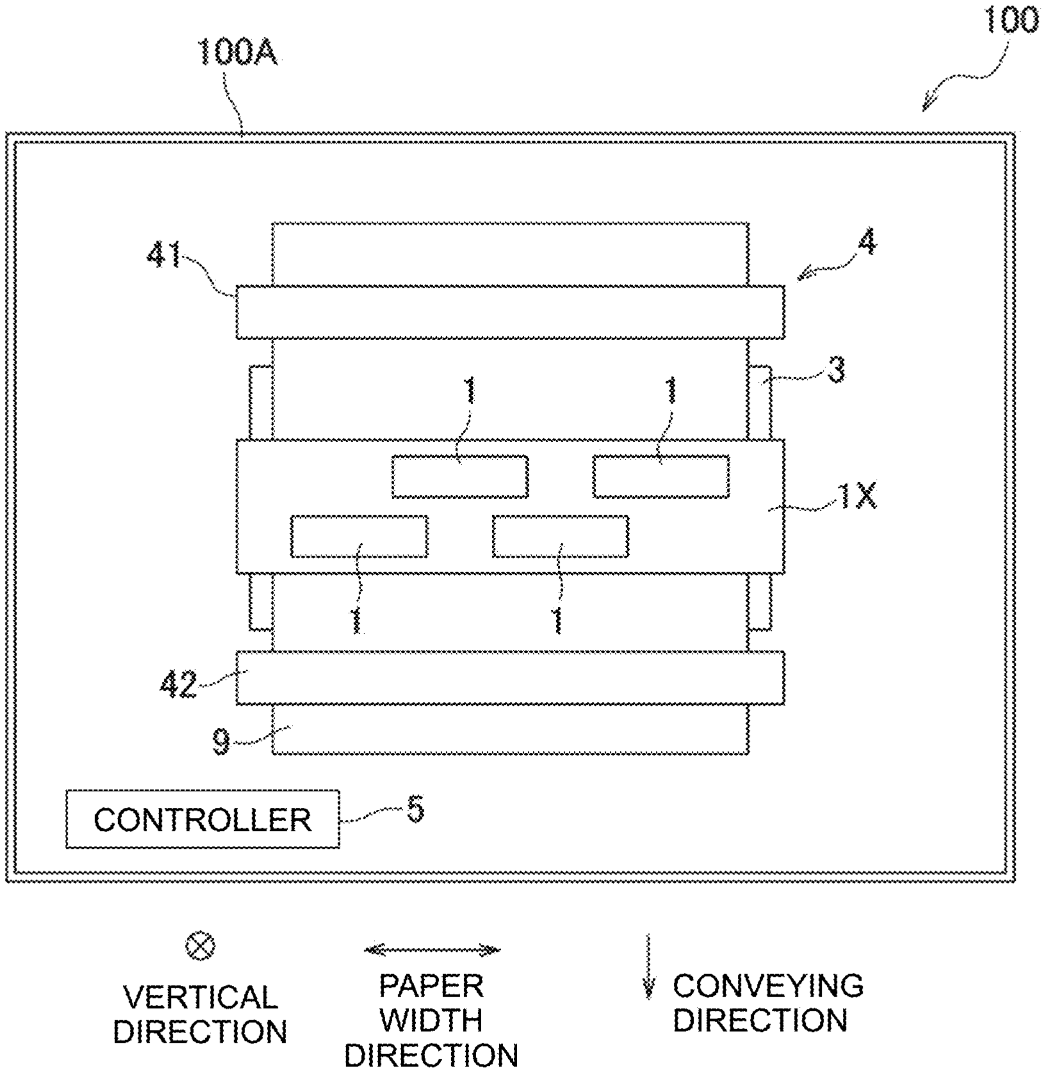
FIG. 1 is a plan view depicting a printer 100 including a head 1.

A head 1 according to a first embodiment of the present disclosure is included in a printer 100. As depicted in FIG. 1, the printer 100 is provided with a casing 100A, a head unit 1X including four heads 1, a platen 3, a conveyor 4 and a controller 5. The head unit 1X, the platen 3, the conveyor 4 and the controller 5 are arranged in the inside of the casing 100A.

A length in a paper width direction of the head unit 1X is longer than a length in a conveying direction of the head unit 1X. The paper width direction is a direction along a width of a paper sheet (paper, sheet) 9, and is orthogonal to the conveying direction and the vertical direction. The head unit 1X is fixed to the casing 100A. The head unit 1X is of a line system.

In the head unit 1X, the four heads 1 are arranged in a staggered manner in the paper width direction. A length in the paper width direction of each of the four heads 1 is longer than a length in the conveying direction of each of the four heads 1.

The platen 3 is a plate along a plane orthogonal to the vertical direction, and is arranged at a location below the head unit 1X. The paper sheet 9 is supported on the upper surface of the platen 3.

Figure 2:
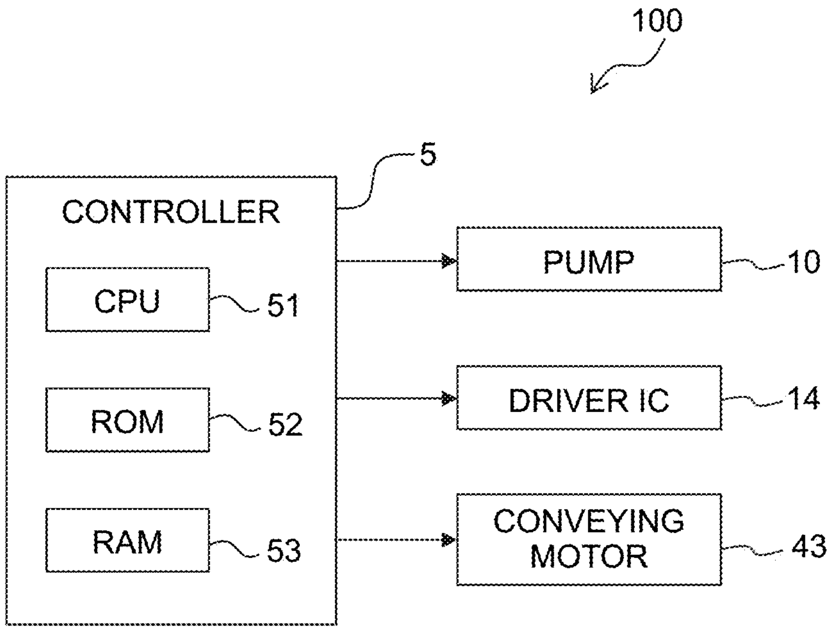
FIG. 2 is a block diagram depicting the electric configuration of the printer 100.

The conveyor 4 includes a roller pair 41 having two rollers, a roller pair 42 having two rollers and a conveying motor 43 as depicted in FIG. 2. In the conveying direction, the head unit 1X and the platen 3 are arranged between the roller pair 41 and the roller pair 42.

In a case that the conveying motor 43 (see FIG. 2) is driven by a control of the controller 5, the rollers of the roller pairs 41 and 42 rotate, thereby conveying the paper sheet 9, which is pinched or held by the rollers of the roller pairs 41 and 42, in the conveying direction.

The controller 5 includes a CPU 51, a ROM 52 and a RAM 53 as depicted in FIG. 2.

The CPU 51 executes a variety of kinds of control based on data inputted from an external apparatus or device and in accordance with a program and data stored in the ROM 52 and the RAM 53. The external apparatus is, for example, a personal computer (PC).

The program and the data by which the CPU 51 performs a variety of kinds of control are stored in the ROM 52. The RAM 53 temporarily stores data used by the CPU 51 in the case that the CPU 51 executes a program.

[Configuration of Head 1]

Figure 4:
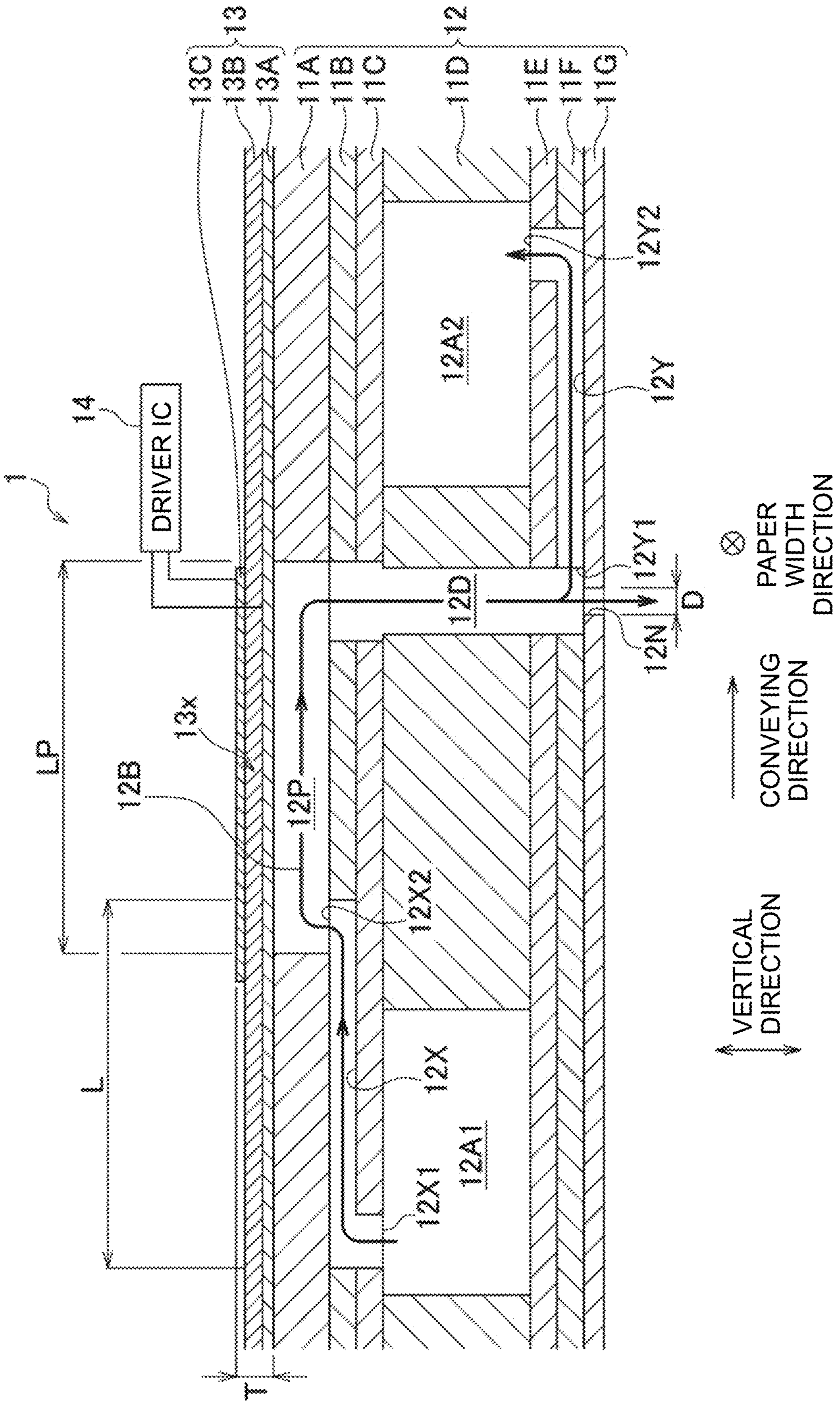
FIG. 4 is a cross-sectional view of the head 1 along a IV-IV line of FIG. 3.

As depicted in FIG. 4, the head 1 includes a channel member 11 and an actuator member 13.

The channel member 12 is constructed of seven plates 11A to 11G. The plates 11A to 11G are stacked in the vertical direction and adhered to one another. A through hole constructing a channel is formed in each of the plates 11A to 11G. The channel includes a supply channel 12A1, a return channel 12A2, and a plurality of individual channels 12B. The supply channel 12A1 corresponds to a “first common channel” of the present disclosure, and the return channel 12B corresponds to a “second common channel” of the present disclosure.

Figure 3:
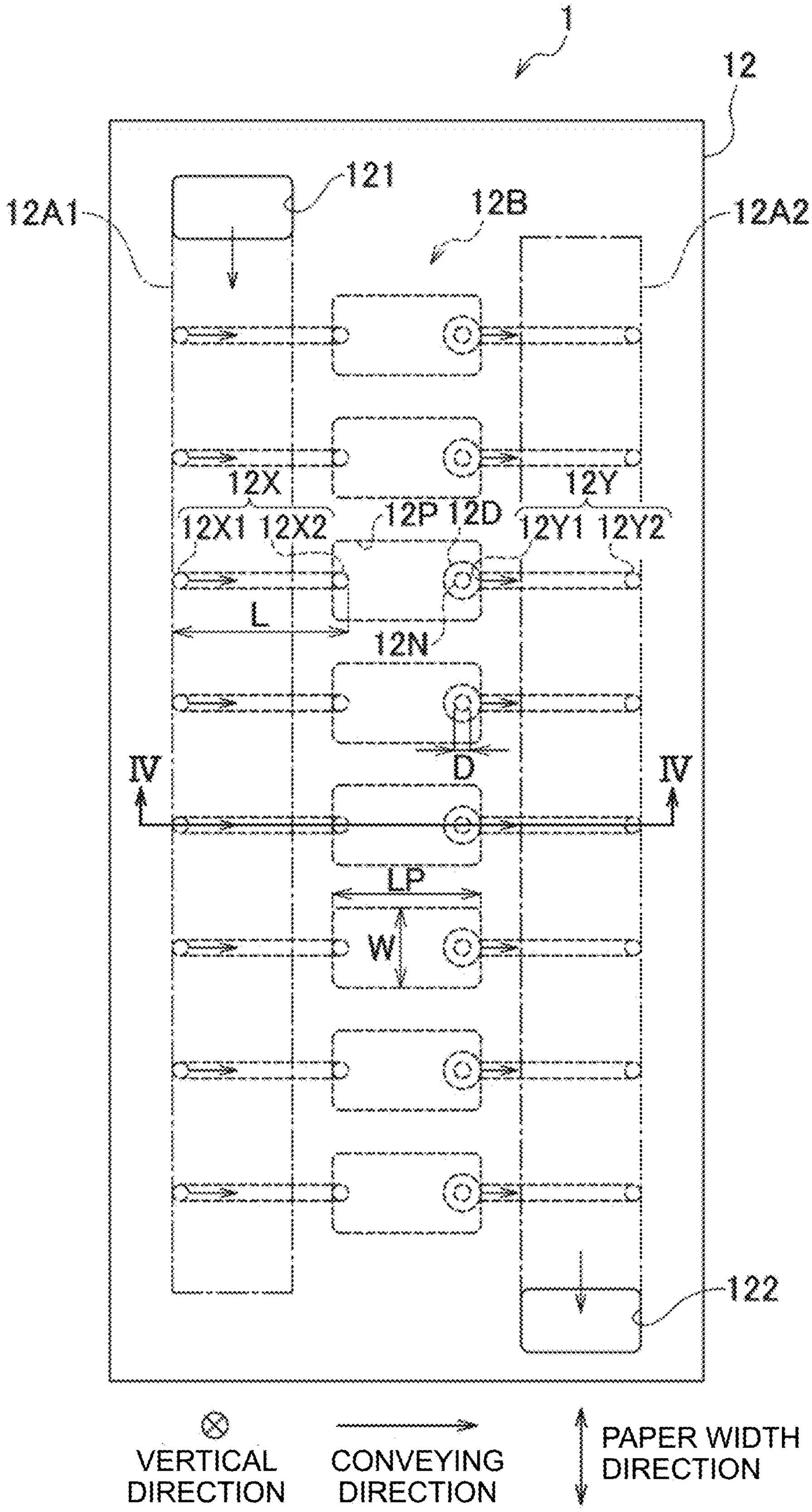
FIG. 3 is a plane view of the head 1.

The plurality of individual channels 12B is arranged or aligned in a row in the paper width direction, as depicted in FIG. 3. Each of the plurality of individual channels 12B has a nozzle 12N, a pressure chamber 12P, a connecting channel 12D, an inflow channel 12X, and an outflow channel 12Y. The inflow channel 12X corresponds to the "first communicating channel" of the present disclosure, and the outflow channel 12Y corresponds to a "second communicating channel" of the present disclosure.

An opening of the nozzle 12N is circular, and an opening of the pressure chamber 12P is substantially rectangular.

As depicted in FIG. 4, the nozzle 12N is constructed of a through hole formed in the plate 11G, and is opened in a lower surface of the channel member 12. A diameter D of the opening of the nozzle 12N is 20 μm or less.

As depicted in FIG. 4, the pressure chamber 12P is constructed of a through hole formed in the plate 11A, and is opened in an upper surface of the channel member 12. A length LP of the pressure chamber 12P is 550 μm or less. A width W (see FIG. 3) of the pressure chamber 12P is 70 μm or less. The length LP is a length in the conveying direction, and the width W is a length in the paper width direction.

The inflow channel 12X connects to an upstream end in the conveying direction of the pressure chamber 12P, and the connecting channel 12D connects to a downstream end in the conveying direction of the pressure chamber 12P. The pressure chamber 12P communicates with the nozzle 12N via the connecting channel 12D.

As depicted in FIG. 4, the connecting channel 12D is constructed of through holes each of which is formed in one of the plates 11B to 11F, and extends in the vertical direction. The connecting channel 12D connects the nozzle 12N and the pressure chamber 12P to each other.

As depicted in FIG. 4, the inflow channel 12X is constructed of through holes each of which is formed in one of the plates 11B and 11C. The inflow channel 12X has one end 12X1 communicating with the supply channel 12A1 and the other end 12X2 communicating with the pressure chamber 12P. The one end 12X1 corresponds to an "inlet port" of each of the plurality of individual channels 12B.

As depicted in FIG. 4, the outflow channel 12Y is constructed through holes, each of which is formed in one of the plates 11E and 11F. The outflow channel 12Y has one end 12Y1 communicating with the connecting channel 12D and the other end 12Y2 communicating with the return channel 12A2. The other end 12Y2 corresponds to an "outlet port" of each of the plurality of individual channels 12B.

As depicted in FIG. 3, the inflow channel 12X and the outflow channel 12Y extend in the conveying direction. Each of the inflow channel 12X and the outflow channel 12Y has a width smaller than the width W of the pressure chamber 12P, and functions as a throttle. A length L in the conveying direction of the inflow channel 12X is in a range of 200 μm to 700 μm.

As depicted in FIG. 4, each of the supply channel 12A1 and the return channel 12A2 is constructed of a through hole formed in the plate 11D.

As depicted in FIG. 3, the supply channel 12A1 and the return channel 12A2 are arranged side by side in the conveying direction and each extend in the paper width direction. A plurality of pressure chambers 12P, each of which belongs to one of the plurality of individual channels 12B, is arranged in the conveying direction between the supply channel 12A1 and the return channel 12A2.

A supply port 121 is connected to one end in the paper width direction of the supply channel 12A1. A return port 122 is connected to the other end in the paper width direction of the return channel 12A2. Each of the supply port 121 and the return port 122 is opened in the upper surface of the channel member 12, and communicates with an ink tank via a tube.

A pump 10 depicted in FIG. 2 is driven by a control of the controller 5 to thereby supply the ink inside the ink tank to the supply channel 12A1 via the supply port 121 and to distribute the ink from the supply channel 12A1 to the plurality of individual channels 12B.

A piezoelectric element 13X (to be described later on) is driven so as to reduce the volume of the pressure chamber 12P, thereby applying a pressure to the ink inside the pressure chamber 12P. The ink to which the pressure is applied is ejected, as an ink droplet of the ink, from the nozzle 12N.

In the case that the piezoelectric element 13X is not driven, the ink inside the plurality of individual channels 12B flows to the return channel 12A2 via the return channel 12Y. This ink returns to the ink tank via the return port 122. By circulating the ink between the ink tank and the channel member 12 in such a manner, it is possible to realize exhaust (discharge) of air and control the increase in the viscosity of the ink in the supply channel 12A1 and the return channel 12A2, and further in each of the plurality of individual channels 12B. Further, in the case that the ink contains any sedimentary component (a component which might sediment, such as a pigment, etc.), such a sedimentary component is agitated, thereby preventing the sedimentation thereof.

Note that in a configuration of circulating the ink between the ink tank and the channel member 12, in a case that a difference between a channel resistance R1 of the inflow channel 12X and a channel resistance R2 of the return channel 12Y is great, a meniscus of the nozzle 12N is broken or destroyed. In the present embodiment, the difference between the channel resistances R1 and R2 is 10% or less of the channel resistance R1, for the purpose of preventing the meniscus of the nozzle 12N from being broken. Further, an intermediate pressure ((P1+P2)/2) between a pressure P1 acting on the supply channel 12A1 and a pressure P2 acting on the return channel 12A2 does not exceed a meniscus pressure of the nozzle 12N.

As depicted in FIG. 4, the actuator member 13 is arranged on the upper surface of the channel member 12. The actuator member 13 includes a vibration plate 13A made of a metal, a piezoelectric layer 13B, and a plurality of individual electrodes 13C.

Parts in the actuator member 13, each of which overlaps with the pressure chamber 12P in the vertical direction, function as piezoelectric elements 13X. The piezoelectric elements 13X are independently deformable in accordance with a potential applied to the plurality of individual electrodes 13C, each of which corresponds to one of the piezoelectric elements 13X.

Each of the piezoelectric elements 13X is a thin film piezoelectric element. The thin film piezoelectric element is a so-called micro electro-mechanical system (MEMS). The piezoelectric elements 13X are formed by performing film formation sequentially on the upper surface of the vibration plate 13A of a thin film which is to be the piezoelectric layer 13B and a thin film which is to be the plurality of individual electrodes 13C. A thickness T of the thin film piezoelectric element is 5 μm or more.

The vibration plate 13A is arranged on the upper surface of the channel member 12 so as to cover the plurality of pressure chambers 12P. The piezoelectric layer 13B is arranged on the upper surface of the vibration plate 13A.

Each of the plurality of individual electrodes 13C is arranged on the upper surface of the piezoelectric layer 13B so as to overlap, in the vertical direction, with a pressure chamber 12P of the plurality of pressure chambers 12P corresponding thereto.

The vibration plate 13A and the plurality of individual electrodes 13C are electrically connected to the driver IC 14. The driver IC 14 maintains a potential of the vibration plate 13A at the ground potential, whereas the driver IC 14 changes the potential of each of the plurality of individual electrodes 13C. The vibration plate 13A functions as a common electrode, which is an electrode common to the plurality of piezoelectric elements 13X.

The driver IC 14 generates a driving signal based on a control signal from the controller 5 and supplies the driving signal to each of the plurality of individual electrodes 13C. The driving signal changes the potential of each of the plurality of individual electrodes 13C between a predetermined driving potential and the ground potential.

[Analysis]

The disclosers of the present disclosure focus on that the channel resistance R1 of the inflow channel 12X influences the under-refilling phenomenon and a residual vibration in the individual channel 12B and performed an analysis in order to obtain a range of the channel resistance R1 capable of preventing the under-refilling phenomenon and of quickly suppressing the residual vibration in the inside of the individual channel 12B, even under a high driving frequency. The under-refilling phenomenon is a phenomenon in which a supply amount of the ink from the supply channel 12A1 to the individual channel 12B becomes insufficient or short.

[First Analysis]

In a case that the channel resistance R1 is too small, the supply amount of the ink from the supply channel 12A1 to the individual channel 12B becomes large, by which, although the under-refilling phenomenon can be prevented, the residual vibration is more likely to remain in the inside of the individual channel 12B.

A general expression of attenuation is as follows:

$$A(t) = \exp(-\xi t) \times \sin(\omega t)$$

wherein A: amplitude, t: time, ξ: attenuation coefficient, ω: angular frequency.

In such a manner, the attenuation rate of the amplitude A is expressed by a product of the attenuation coefficient ξ and a sine curve of the angular frequency ω. As the value of the attenuation coefficient ξ is greater, the attenuation of the amplitude A is quickened. In a case where the general expression of the attenuation is applied to a pressure wave in the inside of the individual channel 12B, the attenuation rate of the amplitude A of the pressure wave in the inside of the individual channel 12B is defined by a natural frequency Fr of the individual channel 12B (≈the angular frequency ω) and the attenuation coefficient ξ of the pressure wave in the inside of the individual channel 12B. In other words, in a case where a target value of the natural frequency Fr and a target value of the attenuation rate are defined, a target value of the attenuation coefficient ξ can be obtained.

In the present embodiment, in order to achieve the capability for high-frequency driving, the natural frequency Fr of the individual channel 12B is made to be 120 kHz, and the target value of the attenuation rate is made to be 10%. Further, a threshold driving frequency of the piezoelectric element 13X is made to be 100 kHz. The threshold driving frequency is a reciprocal of a pinch-off-time. The pinch-off-time is a time from the point of time at which the driving signal is applied to the piezoelectric element 13X and until a point of time at which the tail of the ink droplet is separated from the meniscus of the nozzle 12N. In a case where the driving frequency is 100 kHz, the driving period is 10.0 μs. The attenuation rate is the rate (%) of a vibration after 10.0 μs (driving frequency) from a starting point of time of the vibration under a condition that the vibration at the starting point of time is made to be 100%. It is appreciated that by a numerical calculation performed under such a condition, it is a range in which the attenuation coefficient ξ exceeds 0.30 that the attenuation rate becomes to be less than 10% of the target value.

Figure 5:
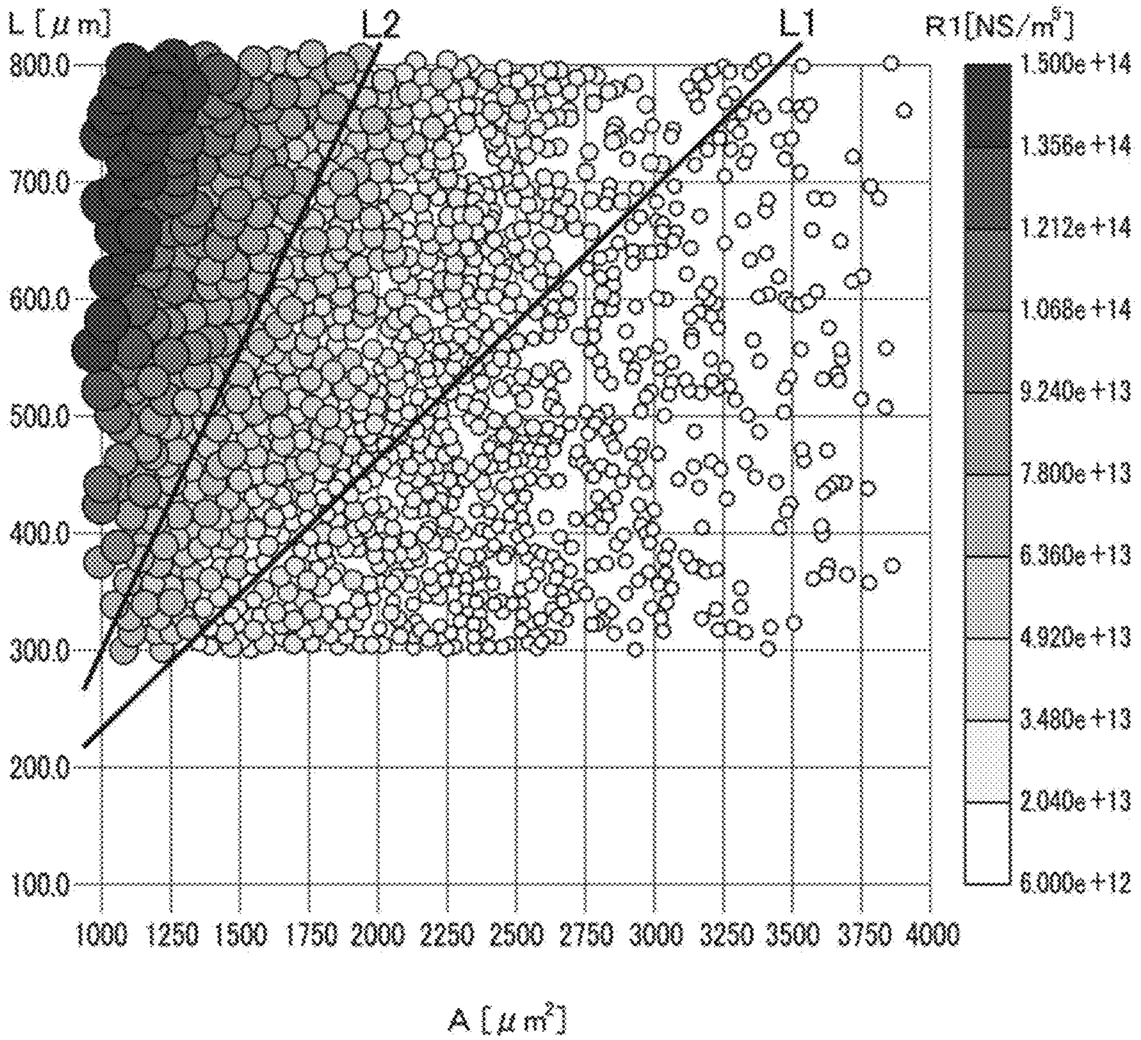
FIG. 5 is a graph indicating the relationship between a length L and a cross-sectional area A of an inflow channel and a channel resistance R1 of the inflow channel.

Further, by an analysis using analytic models of a plurality of the heads 1, which is mutually different in the configuration of the inflow channel 12X, it is appreciated that the attenuation coefficient ξ has an interrelation with the length L and a cross-sectional area A of the inflow channel 12X. The range in which the attenuation coefficient ξ exceeds 0.30 is a range above a straight line L1 indicated in FIG. 5. The straight line L1 corresponds to a linear expression using the length L [μm] and the cross-sectional area A [$\mu m^2$] of the inflow channel 12X: $L=0.22\times A+22$. Further, in a case where the channel resistance R1 of the inflow channel 12 is derived from the length L and the cross-sectional area A of the inflow channel 12X, it is appreciated that the range above the straight line L1 is a range in which the channel resistance R1 [$N\ s/m^5$] is $3.48\times10^{13}$ or more.

In view of the above, in the present embodiment, from the viewpoint of quickly suppressing the residual vibration in the inside of the individual channel 12B, the head 1 is constructed so that the channel resistance R1 [$N\ s/m^5$] of the inflow channel 12X satisfies a relational expression: $3.48\times10^{13}<$R1 and that the length L [μm] and the cross-sectional area A [$\mu m^2$] of the inflow channel 12X satisfies a relational expression: $0.22\times A+22\leq L$. By the channel resistance R1 [$N\ s/m^5$] of the inflow channel 12X satisfying the relational expression: $3.48\times10^{13}\leq$R1 and the length L [μm] and the cross-sectional area A [$\mu m^2$] of the inflow channel 12X satisfying the relational expression: $0.22\times A+22\leq L$, it is possible to quickly suppress the residual vibration in the inside of the individual channel 12B even under a high driving frequency.

[Second Analysis]

In a case that the channel resistance R1 is too great, a large resistance is applied to the ink supply from the supply channel 12A1 to the individual channel 12B, the under-refilling phenomenon is more likely to occur.

The disclosers of the present disclosure prepared experimental models of a plurality of heads 1, which are mutually different in the configuration of the inflow channel 12X and the viscosity of the ink in the inside of the individual channel 12B, supplied the ink from the supply channel 12A1 to the individual channel 12B in each of the experimental models, and obtained an ink flow amount (pl/s) of the ink in a case that the under-refilling phenomenon occurred.

In the present embodiment, in order that the ink droplet is ejected in an amount sufficient for a recording in a recording resolution of 1200 dpi or more, the volume of the ink droplet ejected from the nozzle 12N is made to be 4.0 pl. Further, in order to achieve the capability for high-frequency driving, the threshold driving frequency of the piezoelectric element 13X is made to be 100 kHz, and the amount of the ink ejected from the nozzle 12N is made to be $4.0\times10^5$ pl or more per second. It is appreciated that as a result of the above-described experiment performed under such a condition, it is a range in which the channel resistance R1 [N s/m$^5$] is $6.98\times10^{13}$ or less that the ink flow amount becomes $4.0\times10^5$ pl or more per second. Further, in a case where the length L and the cross-sectional area A of the inflow channel 12X are derived from the channel resistance R1 of the inflow channel 12X, it is appreciated that it is a range in which the length L [μm] and the cross-sectional area A [μm$^2$] of the inflow channel 12X are in a range of "$L\leq0.50\times A-200$" that the ink flow amount becomes to be $4.0\times10^5$ pl or more per second.

In view of the above, in the present embodiment, from the viewpoint of preventing the under-refilling phenomenon, the head 1 is constructed so that the channel resistance R1 [N s/m$^5$] of the inflow channel 12X satisfies a relational expression: $R1\leq6.98\times10^{13}$ and that the length L [μm] and the cross-sectional area A [μm$^2$] of the inflow channel 12X satisfies a relational expression: $L\leq0.50\times A-200$. By the channel resistance R1 [Ns/m$^5$] of the inflow channel 12X satisfying the relational expression $R1\leq6.98\times10^{13}$ and the length L [μm] and the cross-sectional area A [μm$^2$] of the inflow channel 12X satisfying the relational expression: $L\leq0.50\times A-200$, it is possible to prevent the under-refilling phenomenon even under a high driving frequency.

As described above, in the present embodiment, the channel resistance R1 [N s/m$^3$] of the inflow channel 12X satisfies the relational expression: $3.48\times10^{13}\leq R1\leq6.98\times10^{13}$. With this, as the above-described result of the analysis, it is possible to prevent the under-refilling phenomenon and to quickly suppress the residual vibration in the inside of the individual channel 12B even under a high driving frequency.

Further, the length L [μm] and the cross-sectional area A [μm$^2$] of the inflow channel 12X satisfy the relational expression: $0.22\times A+22\leq L\leq0.50\times A-200$. With this, the channel resistance R1 [N s/m$^5$] of the inflow channel 12X is capable of satisfying the relational expression: $3.48\times10^{13}\leq R1\leq6.98\times10^{13}$ in a more ensured manner.

The length L of the inflow channel 12X is in the range of 200 μm to 700 μm. In a case that the length L is less than 200 μm, it is necessary to make the cross-sectional area A small so as to satisfy the relational expression: $3.48\times10^{13}\leq R1\leq6.98\times10^{13}$. In the case that the cross-sectional area A is too small, the ink is less likely to flow into the inflow channel 12X. In a case that the length L exceeds 700 μm, the size of the head 1 becomes great. In this point, in the present embodiment, the length L is in the range of 200 μm to 700 μm, and thus, the ink easily flows into the inflow channel 12X, and the size of the head 1 does not increase.

The natural frequency Fr of the individual channel 12B is 120 kHz or more. In this case, owing to the high natural frequency Fr, the pinch-off-time can be made short, thereby making it possible to eject the ink droplet stably even under a high driving frequency. The phrase "the droplet is ejected stably" or "eject the ink droplet stably" means that after the tail of an ink droplet is separated from the meniscus of the nozzle 12N, the next droplet is ejected and that there is no connecting or linking of the ink droplets.

The piezoelectric element 13X is the thin film piezoelectric element. Since the thickness T of the thin film piezoelectric element 13X is small, the thin film piezoelectric element is easily deformable and is sufficiently deformable even in the case that the pressure chamber 12P is small. Further, since the thin film piezoelectric element has a small thickness and is easily deformable, it is possible to deform the piezoelectric element 13X sufficiently with a low driving voltage.

The thickness T of the thin film piezoelectric element is 5 μm or more. In the thin film piezoelectric element, if the thickness T is too small, the rigidity of the thin film piezoelectric element becomes low, and the natural frequency Fr is lowered. In contrast, in the present embodiment, the thickness T is not too small in the thin film piezoelectric element, and thus the rigidity becomes high. In this case, it is possible to increase the natural frequency Fr of the individual channel 12B, thereby making it possible to eject the ink droplet stably even under a high driving frequency.

The width W of the pressure chamber 12P is 70 μm or less. In this case, due to the small volume of the pressure chamber 12P, the natural frequency Fr of the individual channel 12B is increased, thereby making it possible to eject the ink droplet stably even under a high driving frequency.

The length L of the pressure chamber 12P is 550 μm or less. In this case, due to the small volume of the pressure chamber 12P, the natural frequency Fr of the individual channel 12B is increased, thereby making it possible to eject the ink droplet stably even under a high driving frequency.

The diameter D of the nozzle 12N is 20 μm or less. In a case that the diameter D of the nozzle 12P exceeds 20 μm, an amount V of the ink droplet ejected from the nozzle 12N becomes excessive. In the case that the amount of V becomes excessive, the supply of the ink to the nozzle 12N might become unstable. Further, in such a case, the ink droplet wets and spreads on the paper sheet 9 to a great extent, which in turn might deteriorate the image quality. In view of this, in the present embodiment, the diameter D of the nozzle 12N is made to be 20 μm or less, which in turn prevents the amount V of the ink droplet ejected from the nozzle 12N from becoming excessive. Owing to this, it is possible to supply the ink stably to the nozzle 12N and to prevent any lowering in the image quality, which would be otherwise caused due to the wetting and spreading of the ink droplet.

The difference between the channel resistance R1 of the inflow channel 12X and the channel resistance R2 of the outflow channel 12Y is 10% or less of the channel resistance R1. In a case where the difference between the channel resistances R1 and R2 is great, and the ink is supplied to the individual channel 12B while applying a large pressure to the ink in the inflow channel 12A1 to supply the ink to the individual channel 12B, the meniscus of the nozzle 12N might be easily broken. In view of this, in the present embodiment, the difference between the channel resistances R1 and R2 is small, and thus, even in a case that a large pressure is applied to the ink in the inflow channel 12A1, the meniscus of the nozzle 12N is less likely to be broken. Consequently, this makes it possible to increase the ink supply amount of the ink to be supplied to the individual channel 12B and to prevent the under-refilling phenomenon in an ensured manner.

In the present embodiment, the intermediate pressure ((P1+P2)/2) between the pressure P1 acting on the supply channel 12A1 and the pressure P2 acting on the return channel 12A2, in a case that the ink is supplied from the supply channel 12A1 to the plurality of individual channels 12B and that the ink is returned from the plurality of individual channels 12B to the return channel 12A2, does not exceed the meniscus pressure of the nozzle 12N. In this case, in the configuration of circulating the ink between the ink tank and the channel member 12, it is possible to prevent the meniscus of the nozzle 12N from being broken.

The volume of the ink droplet ejected from the nozzle 12N is made to be 4.0 pl or more. In this case, it is possible to eject the ink droplet in the amount sufficient for the recording in the recording resolution of 1200 dpi or more.

The amount of the ink droplet ejected from the nozzle 12N is made to be $4.0\times10^5$ pl or more per second. In this case, it is possible to eject the ink droplet in the amount sufficient for the recording in the high-speed recording.

The threshold driving frequency of the piezoelectric element 13X is 100 kHz or more. In this case, the high-speed recording can be realized.

The attenuation coefficient $\xi$ of the pressure wave in the inside of the individual channel 12B exceeds 0.30. In this case, it is possible to suppress the residual vibration sufficiently quickly at a high driving frequency which is 100 kHz or more.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, although the electrode constructing the piezoelectric element has a two-layered structure, including the individual electrode and the common electrode, the electrode may have a three-layered structure. The term "three-layered structure" means, for example, a structure including a driving electrode to which a high potential and a low potential are selectively applied, a high potential electrode maintained at the high potential, and a low potential electrode maintained at the low potential.

The kind of head is not limited to the line system and maybe a serial system.

The object of ejection is not limited to being the paper sheet and may be, for example, cloth or fabric, a substrate or plastic, etc.

The liquid droplet ejected from the nozzle is not limited to the ink droplet. The liquid droplet may be, for example, a liquid droplet of a treatment liquid that agglutinates or precipitates a component in the ink.

The present disclosure is not limited to being applicable to the printer and is also applicable to facsimiles, copy machines, multifunction peripherals, etc. Further, the present disclosure is also applicable to a liquid droplet ejecting apparatus used for any other application than the recording of an image. For example, the present disclosure is applicable to a liquid droplet ejecting head, which forms an electroconductive pattern by ejecting an electroconductive liquid onto a substrate.

What is claimed is:

1. A liquid droplet ejecting head comprising:

a channel member including a plurality of individual channels and a first common channel communicating with an inlet port of each of the plurality of individual channels; and a piezoelectric element arranged on the channel member, wherein each of the plurality of individual channels includes a nozzle, a pressure chamber communicating with the nozzle, and a first communicating channel having an end which is the inlet port and the other end which communicates with the pressure chamber, the piezoelectric element is configured to apply a pressure to a liquid inside the pressure chamber to cause a liquid droplet of the liquid to be ejected from the nozzle, and a channel resistance R1 [N s/m$^5$] of the first communicating channel satisfies a first relational expression: $3.48\times10^{13}\leq R1\leq6.98\times10^{13}$.

2. The liquid droplet ejecting head according to claim 1, wherein a length L [μm] and a cross-sectional area A [μm$^2$] of the first communicating channel satisfy a second relational expression: $0.22\times A+22\leq L\leq0.50\times A-200$.

3. The liquid droplet ejecting head according to claim 1, wherein a length L of the first communicating channel is in a range of 200 μm to 700 μm.

4. The liquid droplet ejecting head according to claim 1, wherein a natural frequency Fr of each of the plurality of individual channels is 120 kHz or more.

5. The liquid droplet ejecting head according to claim 1, wherein the piezoelectric element is a thin film piezoelectric element.

6. The liquid droplet ejecting head according to claim 5, wherein a length in an up-down direction of the thin film piezoelectric element is 5 μm or more.

7. The liquid droplet ejecting head according to claim 1, wherein the pressure chamber is included in a plurality of pressure chambers each of which belongs to one of the plurality of individual channels, the plurality of pressure chambers is aligned in a row in a first direction within a plane orthogonal to the up-down direction, and a length in the up-down direction of each of the plurality of pressure chambers is 70 μm or less.

8. The liquid droplet ejecting head according to claim 1, wherein the pressure chamber is included in a plurality of pressure chambers each of which belongs to one of the plurality of individual channels, the plurality of pressure chambers is aligned in a row in a first direction within a plane orthogonal to the up-down direction, and a length in a second direction, which is orthogonal to the first direction, of each of the plurality of pressure chambers is 550 μm or less.

9. The liquid droplet ejecting head according to claim 1, wherein a diameter D of the nozzle is 20 μm or less.

10. The liquid droplet ejecting head according to claim 1, wherein the channel member further includes a second common channel communicating with an outlet port of each of the plurality of individual channels, each of the plurality of individual channels includes a connecting channel configured to connect the nozzle and the pressure chamber, and a second communicating channel having one end communicating with the connecting channel and the other end which is the outlet port, and a difference between the channel resistance R1 of the first communicating channel and a channel resistance R2 of the second communicating channel is 10% or less of the channel resistance R1.

11. The liquid droplet ejecting head according to claim 1, wherein the channel member further includes a second common channel communicating with an outlet port of each of the plurality of individual channels, each of the plurality of individual channels includes a connecting channel configured to connect the nozzle and the pressure chamber, and a second communicating channel having one end communicating with the connecting channel and the other end which is the outlet port, and an intermediate pressure between a pressure acting on the first common channel and a pressure acting on the second common channel in a case that the liquid is supplied from the first common channel to the plurality of individual channels and that the liquid is returned from the plurality of individual channels to the second common channel does not exceed a meniscus pressure of the nozzle.

12. The liquid droplet ejecting head according to claim 1, wherein a volume of the liquid droplet ejected from the nozzle is 4.0 pl or more.

13. The liquid droplet ejecting head according to claim 1, wherein an amount of the liquid droplet ejected from the nozzle is $4.0\times10^5$ pl or more per second.

14. The liquid droplet ejecting head according to claim 1, wherein a threshold driving frequency of the piezoelectric element is 100 kHz or more.

15. The liquid droplet ejecting head according to claim 1, wherein an attenuation coefficient of a pressure wave in each of the plurality of individual channels exceeds 0.30.

* * * * *